US008799783B2

(12) United States Patent
Horwath et al.

(10) Patent No.: US 8,799,783 B2
(45) Date of Patent: Aug. 5, 2014

(54) SYSTEM AND METHOD FOR PRESENTING OPTION DATA USING ANIMATED 3-DIMENSIONAL GRAPHICAL DISPLAY

(75) Inventors: Ron Alex Horwath, San Francisco, CA (US); Sung-Gie Stefen Choy, San Francisco, CA (US)

(73) Assignee: Livevol, Inc., San Francisco, CA (US)

( * ) Notice: Subject to any disclaimer, the term of this patent is extended or adjusted under 35 U.S.C. 154(b) by 387 days.

(21) Appl. No.: 13/009,520

(22) Filed: Jan. 19, 2011

(65) Prior Publication Data

US 2011/0179360 A1 Jul. 21, 2011

Related U.S. Application Data

(60) Provisional application No. 61/296,420, filed on Jan. 19, 2010.

(51) Int. Cl.
*G06F 3/048* (2013.01)
*G06Q 40/04* (2012.01)

(52) U.S. Cl.
CPC .................................... *G06Q 40/04* (2013.01)
USPC ........................................................ 715/738

(58) Field of Classification Search
USPC .............. 715/738; 705/7.28–7.31, 7.35, 7.41
See application file for complete search history.

(56) References Cited

U.S. PATENT DOCUMENTS

| | | | | |
|---|---|---|---|---|
| 4,988,981 A * | 1/1991 | Zimmerman et al. | ......... | 345/158 |
| 5,524,187 A * | 6/1996 | Feiner et al. | ................... | 345/419 |
| 6,049,783 A * | 4/2000 | Segal et al. | ...................... | 705/37 |
| 7,165,036 B2 * | 1/2007 | Kruk et al. | ................... | 705/7.11 |
| 7,219,034 B2 * | 5/2007 | McGee et al. | ................ | 702/180 |
| 7,801,788 B2 * | 9/2010 | Rosendorf | .................. | 705/36 R |
| 2001/0056398 A1 * | 12/2001 | Scheirer | .......................... | 705/38 |
| 2003/0028459 A1 * | 2/2003 | Hillel | .............................. | 705/36 |
| 2007/0156479 A1 * | 7/2007 | Long | ............................... | 705/7 |
| 2008/0183639 A1 * | 7/2008 | DiSalvo | ...................... | 705/36 R |
| 2009/0125447 A1 * | 5/2009 | Gorelik et al. | ............. | 705/36 R |
| 2009/0278848 A1 * | 11/2009 | Robertson et al. | ......... | 345/440.2 |
| 2011/0066933 A1 * | 3/2011 | Ludwig | ......................... | 715/212 |
| 2013/0132811 A1 * | 5/2013 | Ludwig | ......................... | 715/212 |
| 2013/0174004 A1 * | 7/2013 | Ludwig | ......................... | 715/215 |

* cited by examiner

*Primary Examiner* — Phenuel Salomon
(74) *Attorney, Agent, or Firm* — Steptoe & Johnson LLP

(57) ABSTRACT

System juxtaposes filtered and analyzed option data in a three-dimensional dynamic graph, which is displayed, for example, on a computer display terminal to the option trader. The option trader views the selectively filtered option data presented by the system in a way that reveals trends, risk and pricing over time. System is further capable of sequentially displaying (playing) hundreds of images of graphical option data representation to create an animation of dynamics of options volatility over time. In a real time trading environment, using these vast amounts of information presented in easily comprehendible form, such as reviewing years of historical records in a matter of seconds, a trader can quickly recognize various market opportunities. Further advantage of comes from the fact that the option trader gradually learns to recognize the significance of the various shapes and patterns of the displayed information and use them to execute profitable trades.

22 Claims, 6 Drawing Sheets

SYSTEM AND METHOD FOR PRESENTING OPTION DATA USING ANIMATED 3-DIMENSIONAL GRAPHICAL DISPLAY

CROSS-REFERENCE TO RELATED PATENT APPLICATION

This regular U.S. patent application claims the benefit of priority under 35 U.S.C. §119 and relies on U.S. provisional patent application Ser. No. 61/296,420, filed on Jan. 19, 2010, the entire disclosure of which is incorporated by reference herein.

BACKGROUND OF THE INVENTION

1. Field of the Invention

The present invention relates generally to financial data analysis and presentation and, more specifically, to a system and method for presenting option data to a trader using graphical representation.

2. Description of the Related Art

Option trading is one of the most complex and dynamic trading areas. Option traders must create and execute various trading strategies based on risk analysis and other pertinent information. To this end, options traders must quickly identify potentially profitable trades based on the snapshot of current market conditions as well as historical data and make quick buy/sell decisions during active trading sessions. The amount of data that needs to be analyzed by a trader in order to make a profitable trade is very large. Unfortunately, most of these data is available in unstructured form and cannot be easily comprehended by a human within a short period of time.

For this reason, information systems that present pertinent historical and real-time option data and risk analysis in a clear, concise and informative way enable traders to make faster and better trading decisions and provide options traders with an advantage over other traders who use the traditional option data presentation methods and tools. Thus, novel systems and methods for displaying option data to traders in an informative and easily comprehensible manner are needed.

SUMMARY OF THE INVENTION

The inventive methodology is directed to methods and systems that substantially obviate one or more of the above and other problems associated with conventional techniques for displaying option data to traders.

In accordance with one aspect of the inventive concept, there is provided a computerized system incorporating a communication interface configured to couple the computerized system to a network; a processing unit configured to obtain option data, to filter the obtained option data in accordance with filtering criteria, and to generate graphical representation of the filtered option data for display to a user; and a storage unit. In the computerized system, the processing unit obtains the option data from a remote data provider using the communication interface or causes the option data to be retrieved from the storage unit and causes the graphical representation of the filtered option data to be displayed to the user. The graphical representation of the filtered option data includes interposed volatility data for multiple option contracts; and the filtering criteria involves at least selecting out of the money options and excluding options with no bids.

In accordance with another aspect of the inventive concept, there is provided a computer-implemented method involving coupling, using a communication interface, the computerized system to a network; using a processing unit to obtain option data, to filter the option data in accordance with filtering criteria, and to generate graphical representation of the filtered option data for display to a user; allocating a storage resource in a storage unit, wherein the option data is obtained from a remote data provider via the communication interface or retrieved from the storage unit; and causing the graphical representation of the filtered option data to be displayed to the user. The graphical representation of the filtered option data includes interposed volatility data for multiple option contracts and the filtering criteria involves at least selecting out of the money options and excluding options with no bids.

In accordance with yet another aspect of the inventive concept, there is provided a computer-readable medium embodying a set of instructions, which, when executed by one or more processors, cause the one or more processors to execute a method involving coupling, using a communication interface, the computerized system to a network; using a processing unit to obtain option data, to filter the option data in accordance with filtering criteria, and to generate graphical representation of the filtered option data for display to a user; allocating a storage resource in a storage unit, wherein the option data is obtained from a remote data provider via the communication interface or retrieved from the storage unit; and causing the graphical representation of the filtered option data to be displayed to the user. The graphical representation of the filtered option data includes interposed volatility data for multiple option contracts and the filtering criteria involves at least selecting out of the money options and excluding options with no bids.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1A:
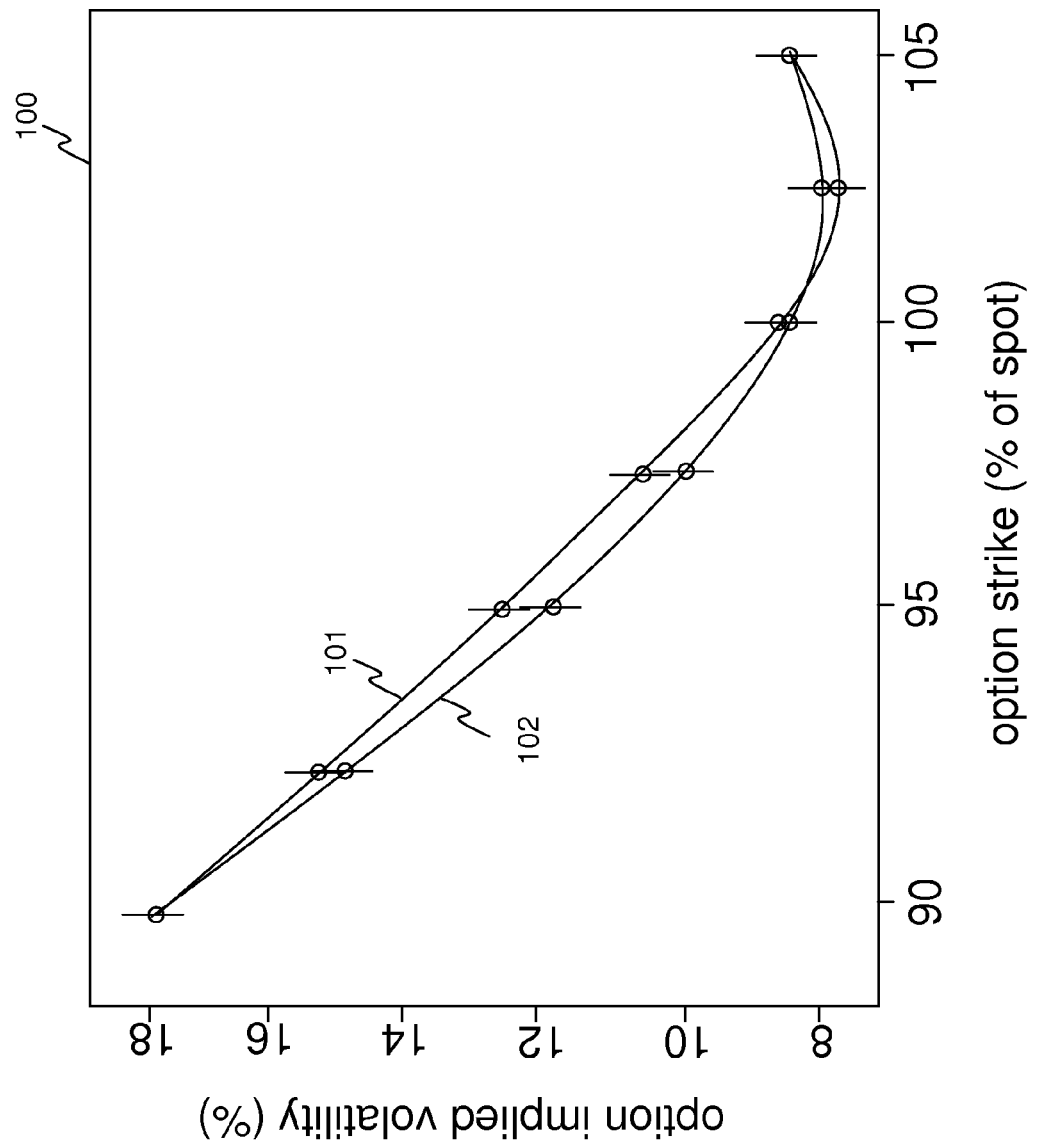
FIG. 1A illustrates a conventional option volatility skew chart for a single option contract.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one or more embodiments of the inventive concept, there is provided a computerized system and associated method as well as a corresponding computer programming product for generating an enhanced graphical interface that offers improvements to conventional systems for facilitating trading of options on options markets. The improvements provided by one or more embodiments of the invention include enabling faster decisions by the trader during a trading session, increased ability to identify risks and opportunities in the market, faster analysis of comparative options skews and new ways to analyze option premiums in a faster, more beneficial way over the traditional methods of option data analysis and presentation.

In accordance with one or more embodiments of the inventive concept, the pertinent option data is displayed to the trader in a real-time, historic and time-projection three-dimensional graphs, which provide the option trader with a means to quickly uncover potential trading opportunity, speed up trade executions and quickly identify potential risks. In accordance with one or more embodiments of the inventive concept, the inventive system accesses the historic as well as real-time option data and performs analysis of the received data in order to display the relevant information to the option trader in an informative, easily comprehendible format.

In accordance with one or more embodiments of the inventive concept, an inventive real time view of the option data alerts the trader to the current skew, for options in the same month, as well as in comparison with all other options in the option chain. In addition, in order to make a decision in a real time environment, it is widely accepted that analysis and presentation of the historical data is important. The chief difficulty that many option traders face in analyzing historical data is that the amount of the raw historical option data is very large and this data is unstructured. For example, option data for one underlying issue for a two-year period can easily exceed 50,000 records of historical data values. Unlike conventional two-dimensional stock charts having about 500 data points in a two-year historical time period, there is no easy way to get useful information out of such an extensive options dataset, simply because of its sheer size.

In accordance with one or more embodiments of the inventive concept, the inventive system juxtaposes filtered and analyzed option data in a three-dimensional dynamic graph, which is displayed, for example, on a computer display terminal to the option trader. The option trader views the selectively filtered option data presented by the embodiments of the inventive system in a way that reveals trends, risk and pricing over time. Further advantage of various embodiments of the inventive technique comes from the fact that the option trader gradually learns to recognize the significance of the various shapes and patterns of the displayed information and use them to execute profitable trades.

In accordance with one or more embodiments of the inventive concept, the inventive system is capable of sequentially displaying (playing) hundreds of images of graphical option data representation to create an animation of dynamics of options volatility over time. In a real time trading environment, using these vast amounts of information presented in easily comprehendible form, such as reviewing years of historical records in a matter of seconds, a trader can quickly recognize various market opportunities. Certain patterns signify lower risk and opportunity over other patterns, much like the Japanese candle charts have recognizable patterns that stock traders learn.

FIG. 1A illustrates a conventional option volatility skew chart 100. The skew chart 100 includes two curves: curve 101 corresponds to put options and curve 102 corresponds to call options. The variable on the horizontal (X) axis is an option strike price, while the variable on the vertical (Y) axis is the implied volatility. As it is well known to persons of ordinary skill in the art, the option implied volatility (IV) is the measure of the volatility of the underlying implied by the market price of the option. This implied volatility is calculated based on a particular option pricing model. In other words, it is the volatility that, when used in a particular pricing model, yields a theoretical value for the option price equal to the current market price of that option. One exemplary option pricing model widely used for calculating implied volatility is Black-Scholes pricing model well known to persons of ordinary skill in the art. However, it should be noted that the inventive concept is not limited to the Black-Scholes pricing model for calculating volatility values and any other suitable model now known or developed in the future may be used for that purpose. It should be noted that the aforesaid implied volatility is often used as a measure of the true option value.

The volatility curve 101 on the chart 100 is formed by a connected string of data points, and clearly shows that the implied volatility is "skewed" towards the out of money put options corresponding to the strike price values in the left portion of the chart 100. The implied volatility values near the strike prices close to the current value of the underlying (at the money strike prices) is often smaller that the implied volatility for out of the money puts (at the left of the chart 100) and out of the money calls (at the right of the chart 100). Thus, the volatility curve 101 as a function of the strike price has a characteristic shape of a "smile" and is, therefore, called a "volatility smile".

Figure 1B:
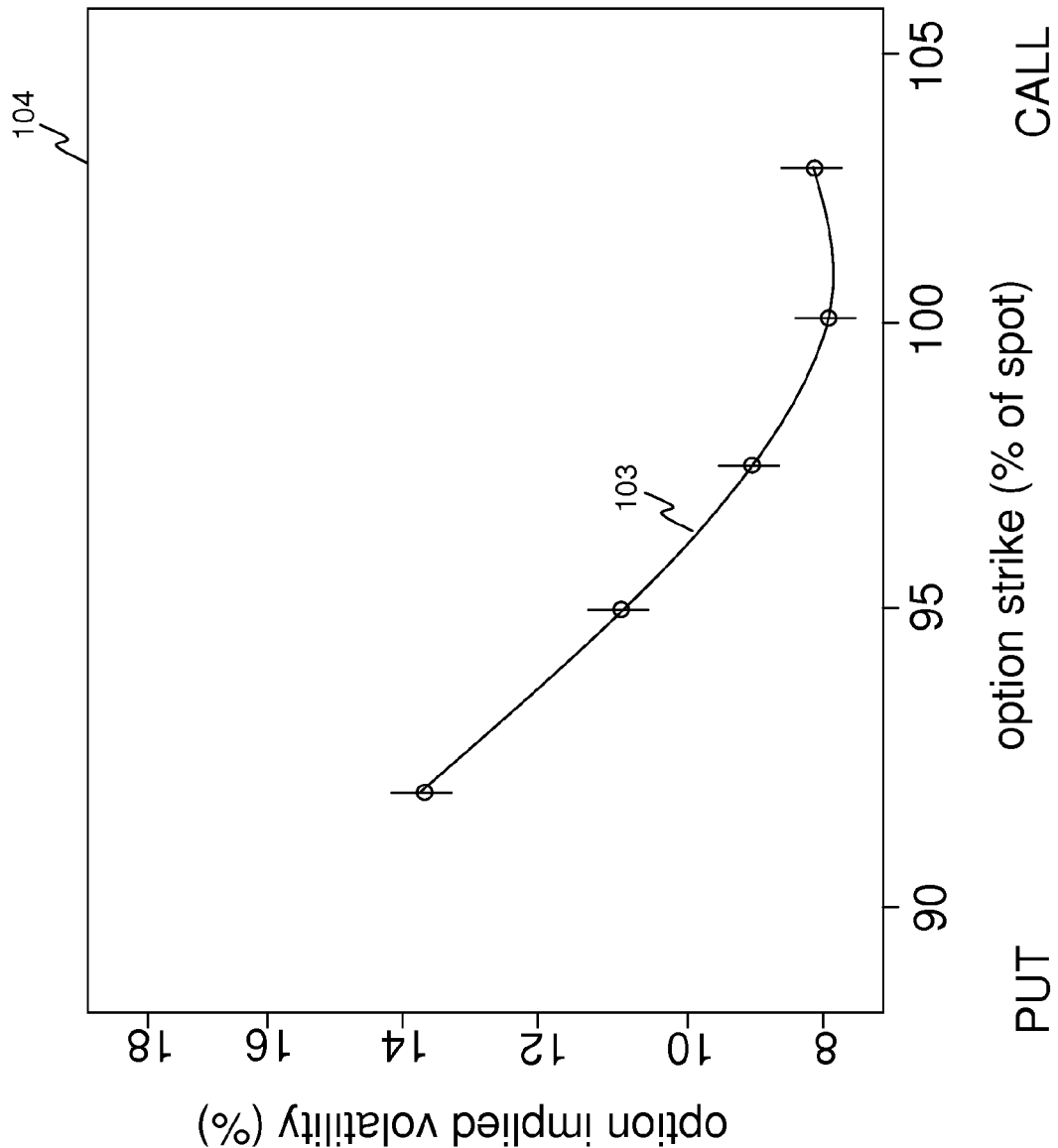
FIG. 1B illustrates an exemplary skew chart processed in accordance with an embodiment of the inventive methodology.

FIG. 1B illustrates an exemplary skew chart 104 processed in accordance with an embodiment of the inventive methodology. Specifically, the skew chart 104 includes a single curve 103, which is generated using data points corresponding to only out of the money (OTM) option data (both OTM puts and calls). Moreover, in accordance with one or more embodiments of the inventive concept, the data shown in the skew chart 103 has been filtered in accordance with a filtering criteria which excludes options with no bids.

Figure 2:
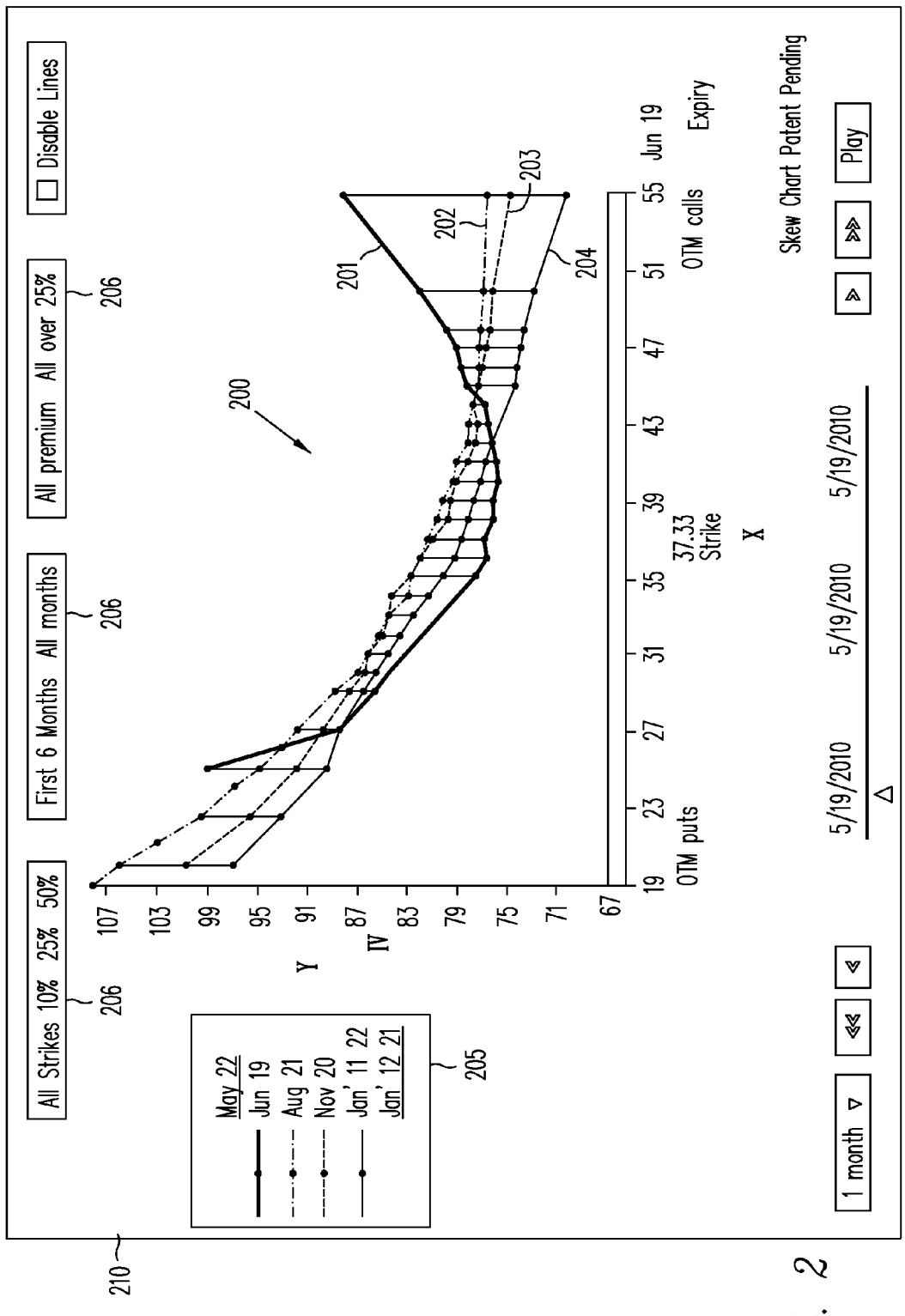
FIG. 2 illustrates an exemplary option volatility skew chart generated by means of a user interface in accordance with one or more embodiments of the inventive concept.

FIG. 2 illustrates an exemplary option volatility skew chart 200 generated by means of a user interface 210 in accordance with one or more embodiments of the inventive concept. The chart 200 illustrated in FIG. 2 provides the trader with multiple implied volatility curves 201, 202, 203 and 204 drawn on the same chart 200, which are formed by strings of data points corresponding to multiple option contracts for the same underlying with different option expiration dates. As would be appreciated by those of skill in the art, having multiple volatility curves 201, 202, 203 and 204 on the same chart 200 provides the trader with the information on the dynamics of the implied volatility changes with time. In one or more embodiments of the invention, the volatility curves corresponding to different option contracts are color-coded for ease of differentiation. In another embodiment, these volatility curves are drawn using distinct line styles.

In one or more embodiments of the inventive concept, the system receives a selection of the option contracts to be displayed on the chart from the trader using an option contact selection interface 205, wherein the trader may select or unselect appropriate option contracts for display on the volatility chart 200 by clicking on the appropriate option contract symbol.

In one or more embodiments of the invention, the option data displayed on the chart 200 may be filtered using one or more filtering criteria specified by the trader. Specifically, in one embodiment, the trader is provided with a data filter criteria selection interface 206, which is designed to enable the trader to select filtering criteria for the option data displayed on the volatility chart 200. The trader's section made using the filter criteria selection interface 206 is received by the inventive system and the corresponding chart 200 is appropriately updated to reflect the selected filtering criteria.

In accordance with one or more embodiments of the invention, the trader may use the data filter criteria selection interface 206 to select option data for all strike prices or for a subset of strike prices. In one exemplary embodiment, the trader may select to view volatility data for either 10%, 25% or 50% out of the money options. In another embodiment, in lieu of, or in addition to, selecting the option contracts to be displayed using the option contact selection interface 205, the trader may select to view all contracts expiring within a predetermined future period, such as next six months, or all available contracts. In one or more embodiments of the invention, the data filter criteria selection interface 206 also enables the trader to select the option contracts with all premium values or specific premium values. In one or more embodiments of the inventive concept, the filtering criteria may also exclude options with no bids. Specifically, in one or more embodiments of the inventive concept, the filtering criteria used in generating the data points used in creating the skew chart selects for inclusion into the skew chart only out of the money (OTM) options and excludes options with no bibs.

Figure 3:
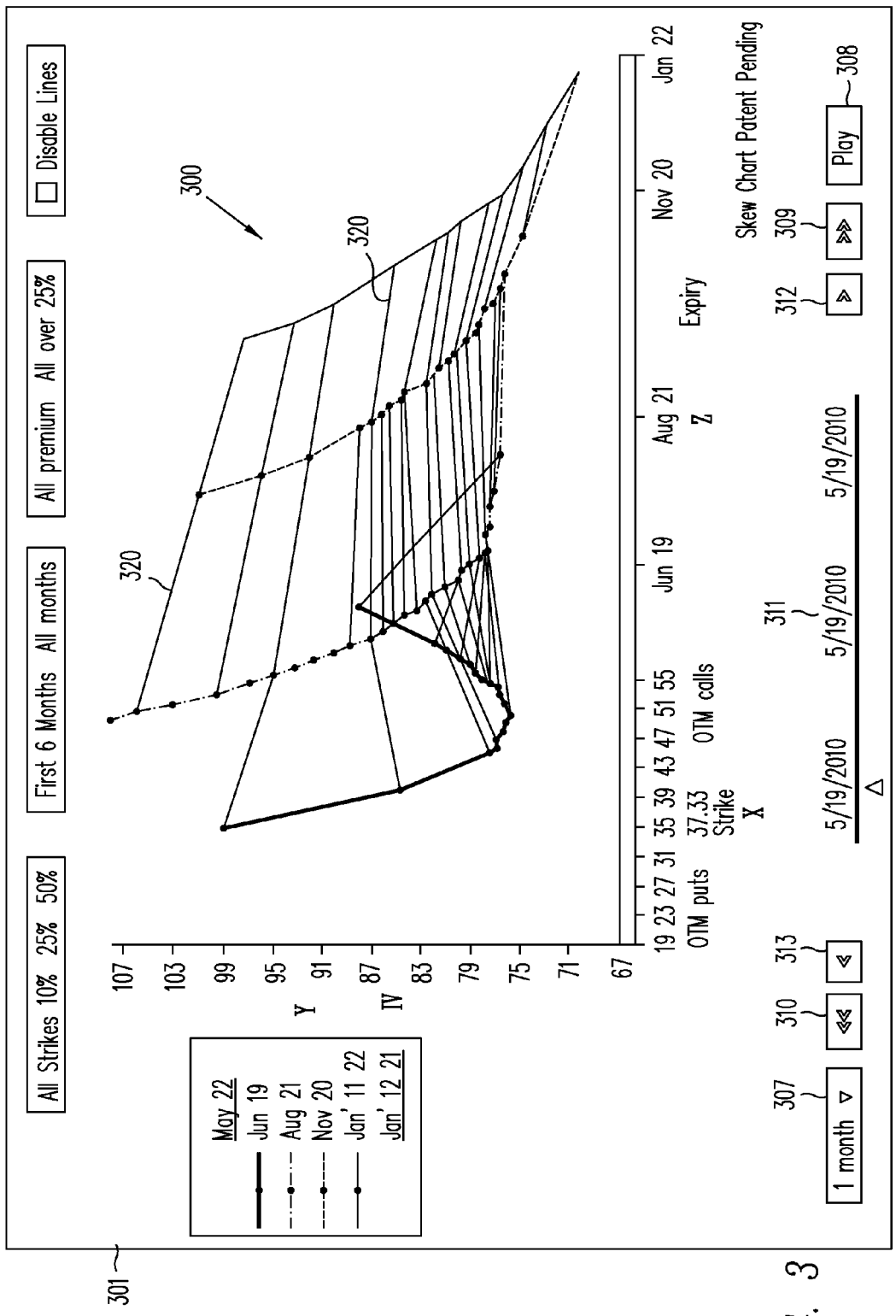
FIG. 3 illustrates another exemplary option volatility skew chart generated by means of a user interface in accordance with one or more embodiments of the inventive concept.

FIG. 3 illustrates another exemplary option volatility skew chart 300 generated by means of a user interface 301 in accordance with one or more embodiments of the inventive concept. The skew chart illustrated in FIG. 3 is three-dimensional, with the expiration date for each option contract illustrated in the chart being marked along the third, (Z) axis of the chart 300. In various embodiments, the aforesaid Z axis may show either calendar days or trading days. In one or more embodiments of the invention, the data points on the different volatility curves corresponding to the same strike price are connected using lines 320. In one or more embodiments, the curves in FIG. 3 corresponding to different option contracts may be color-coded for the ease of visual comprehension thereof by the trader.

In one or more embodiments of the invention, the inventive used interface is provided with skew chart rotation interface operable to receive from the trader a command to rotate the skew chart in an appropriate manner. In one exemplary embodiment, the system is operable to detect an action by the trader, wherein the trader drags the mouse cursor in an appropriate direction. The system detects the mouse drag direction and/or distance provided by the trader and appropriately rotates the skew chart in three dimensions displaying the resulting view to the trader.

To generate the skew chart view similar to the one illustrated in FIG. 3, one or more embodiments of the inventive system are configured to access a database, flat data files, memory storage area, or any other data container with option data, to issue a query to said database or search other data storage using the criteria specified by the trader using the inventive user interface 301, to retrieve the corresponding data from the database or other data storage, to analyze the retrieved data, to generate the skew chart representation based on the retrieved data, and to display the generated representation to the trader. It should be noted that the displayed data (implied volatility) is calculated, and can be pre-calculated and stored on the server, the client, or dynamically calculated using the display software or hardware.

In one or more embodiments of the invention, the inventive user interface is operable to provide the trader with a representation on how the skew chart has changed in the past. Specifically, in one exemplary embodiment, the system plays a movie representing the historical changes in the skew chart over the predetermined time period. In one embodiment, each frame in the aforesaid movie represents a skew chart as it looked on a specific day during the aforesaid time period. To this end, the skew chart 300 illustrated in FIG. 3 is provided with an interface 307 for receiving a selection of the aforesaid time period as well as play/pause 308, forward 309 and rewind 310 buttons, which are used by the trader to control the display of the aforesaid skew chart movie. In one or more embodiments, the inventive interface may also include a scale interface 311 for receiving a selection of specific day from the trader. Based on the trader's day selection performed using the scale interface 311, the embodiment of the inventive system is operable to display a historical skew chart 300, as it existed on the selected day. Two additional interface buttons 312 and 313 enable the trader to select the next or the previous day, respectively, and to view the updated skew chart for the newly selected day. For each selected day, the embodiments of the inventive user interface enable the trader to alter the various skew chart parameters using the interfaces described above.

To generate the historical skew chart view, one or more embodiments of the inventive system are configured to access a database, flat data files, or any other data storage with historical option data, to issue a query to said database or search other data using the criteria specified by the trader using the inventive user interface, to retrieve the corresponding data from the database or other data storage, to analyze the retrieved data, to generate the historical skew chart representation based on the retrieved data, and to display the generated representation to the trader.

As would be appreciated by those of skill in the art, the described skew chart generation interface and the associated tools and features provide the trader with representation of dynamics of the option volatility data in a very informative and concise form. Moreover, in one or more embodiments of the invention, the inventive system may automatically detect put option and call option disparity and alert the trader of the detected disparity. In one or more embodiments of the invention, the system additionally provides a user interface for fast, one-click submission of option trade orders to enable the option trader to quickly react to the opportunities discovered using the inventive option data presentation methodology.

Figure 4:
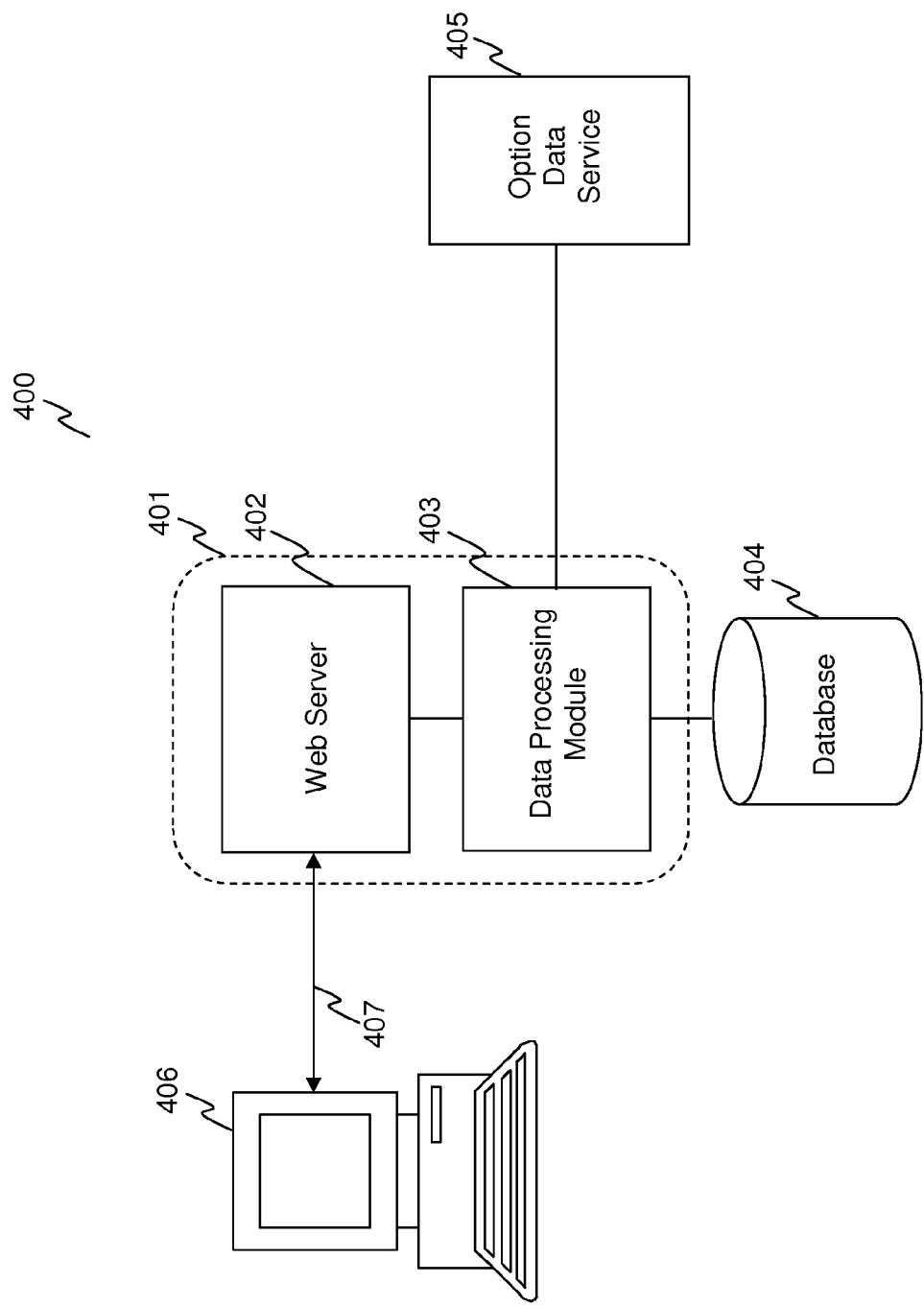
FIG. 4 illustrates an exemplary embodiment of system architecture on which various embodiments of the inventive methodology may be deployed.

FIG. 4 illustrates an exemplary embodiment of system architecture 400 on which various embodiments of the inventive methodology may be deployed. The exemplary architecture illustrated in FIG. 4 incorporates a computer/server platform 401 on which a web server module 402 and data processing module 403 are deployed. The data processing module receives the historical option data from a database 404, which may be deployed locally within in the proximity the same computer/server system 401 or accessed remotely using a network interface of the computer/server system 401. The data processing module 403 also receives the real time option data provided by the remote option data service 405, which it accesses using network interface of the computer/server system 401. The trader accesses the inventive system using a client computer system 406 via network link 407. Specifically, the client computer system establishes a network connection with the web server 402 using a network communication protocol, such as HTTP. As would be appreciated by those of skill in the art, the present invention is not limited to any specific communication protocol and any other presently known or future developed protocol may be used to access the inventive system by the clients. The web server 402 furnishes a markup language code, such as HTML code, to the client 406, which generates the inventive charts and associated interfaces in the trader's browser window (not shown).

Trader's commands are sent from the trader's web browser, or installable desktop software application deployed on the client 406 to the web server 402 and transmitted to the data processing module 403. The data processing module 403 uses the historical as well as real-time option data to generate the skew charts based on the commands and selections received from the trader. The skew charts are then transmitted to the web server 402, which furnishes them back to the trader's client computer 406 via HTTP, whereupon the generated charts are displayed to the trader using a web browser (not shown).

In another embodiment of the invention, the skew charts are generated on the client computer 406 using intermediate data received from the data processing module 403 via the web server 402. The charts are generated on the client 406 using a client-side application (not shown), such as JAVA applet executing on the client's web browser. In yet another embodiment, the skew charts are generated entirely on the client computer 406 using a client desktop application installed on the client computer 406, which is configured to receive options data from a remote options data service accessible through a network and which is also configured to perform all the processing necessary for creating and displaying skew charts locally on the client computer 406.

Figure 5:
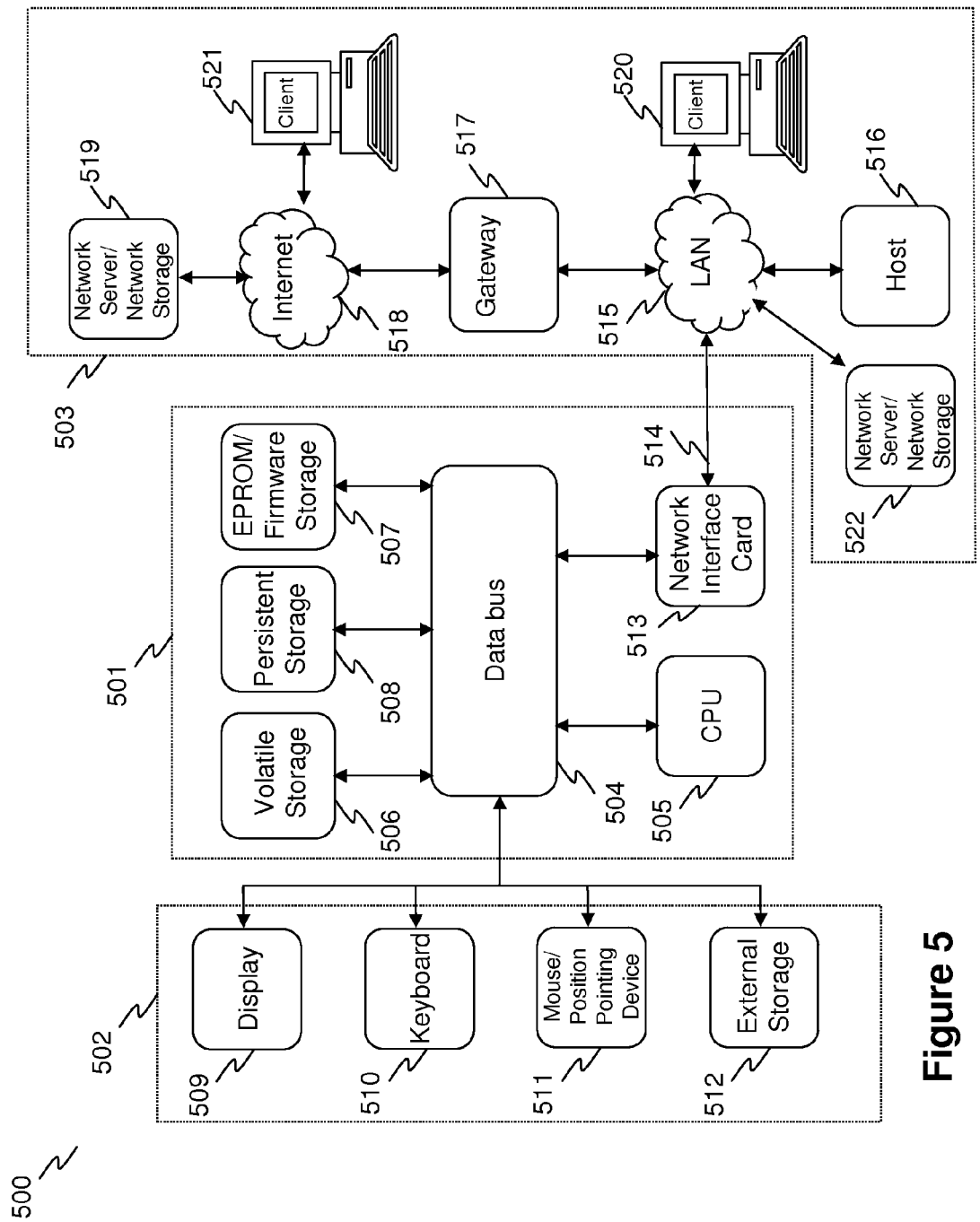
FIG. 5 illustrates an exemplary embodiment of a computer platform upon which the inventive system may be implemented.

FIG. 5 is a block diagram that illustrates an embodiment of a computer/server system 500 upon which an embodiment of the inventive methodology may be implemented. The system 500 includes a computer or server platform 501, peripheral devices 502 and network resources 503.

The computer platform 501 may include a data bus 504 or other communication mechanism for communicating information across and among various parts of the computer platform 501, and a processor 505 coupled with bus 504 for processing information and performing other computational and control tasks. Computer platform 501 also includes a volatile storage 506, such as a random access memory (RAM) or other dynamic storage device, coupled to bus 504 for storing various information as well as instructions to be executed by processor 505. The volatile storage 506 also may be used for storing temporary variables or other intermediate information during execution of instructions by processor 505. Computer platform 501 may further include a read only memory (ROM or EPROM) 507 or other static storage device coupled to bus 504 for storing static information and instructions for processor 505, such as basic input-output system (BIOS), as well as various system configuration parameters. A persistent storage device 508, such as a magnetic disk, optical disk, or solid-state flash memory device is provided and coupled to bus 504 for storing information and instructions.

Computer platform 401 may be coupled via bus 504 to a display 509, such as a cathode ray tube (CRT), plasma display, or a liquid crystal display (LCD), for displaying information to a system administrator or user of the computer platform 501. An input device 510, including alphanumeric and other keys, is coupled to bus 504 for communicating information and command selections to processor 505. Another type of user input device is cursor control device 511, such as a mouse, a trackball, or cursor direction keys for communicating direction information and command selections to processor 505 and for controlling cursor movement on display 509. This input device typically has two degrees of freedom in two axes, a first axis (e.g., x) and a second axis (e.g., y), that allows the device to specify positions in a plane.

An external storage device 512 may be coupled to the computer platform 501 via bus 504 to provide an extra or removable storage capacity for the computer platform 501. In an embodiment of the computer system 401, the external removable storage device 512 may be used to facilitate exchange of data with other computer systems.

The invention is related to the use of computer system 401 for implementing the techniques described herein. In an embodiment, the inventive system may reside on a machine such as computer platform 501. According to one embodiment of the invention, the techniques described herein are performed by computer system 501 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 508. Volatile media includes dynamic memory, such as volatile storage 506.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 505 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 504. The bus 504 carries the data to the volatile storage 506, from which processor 505 retrieves and executes the instructions. The instructions received by the volatile memory 506 may optionally be stored on persistent storage device 408 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 504. Communication interface 513 provides a two-way data communication coupling to a network link 515 that is coupled to a local network 515. For example, communication interface 513 may be an integrated services digital network (ISDN) card or a modem to provide a data communication connection to a corresponding type of telephone line. As another example, communication interface 513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network interface 513 typically provides data communication through one or more networks to other network resources. For example, network link 515 may provide a connection through local network 515 to a host computer 516, or a network storage/server 517. Additionally or alternatively, the network link 513 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 515 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 515 and communication interface 513. In the Internet example, when the system 501 acts as a network server, it might transmit a requested code or data for an application program running on client(s) 520 and/or 521 through Internet 518, gateway/firewall 517, local area network 515 and communication interface 513. Similarly, it may receive code from other network resources.

The received code may be executed by processor 405 as it is received, and/or stored in persistent or volatile storage devices 408 and 406, respectively, or other non-volatile storage for later execution.

As stated above, the database 404 for storing option data used by the inventive system may be deployed either within the computer platform 501 or on a remote server. In the former scenario, the option data would be stored on one of the storage devices of the system, such as data storage devices 506, 507 and/or 512. In the latter case, the inventive system accesses the historical and/or real-time option data using the communication interface 513 as well as network links 515 and/or 518 from a network storage/server 517.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the inventive system and method for displaying option data to the user. It is intended that the specification and examples be considered as exemplary only, with a true scope and spirit of the invention being indicated by the following claims.

What is claimed is:

1. A computerized system comprising:
a communication interface configured to couple the computerized system to a network;
a processing unit configured to obtain option data, to filter the obtained option data in accordance with filtering criteria, and to generate graphical representation of the filtered option data for display to a use; and
a storage unit, wherein the processing unit obtains the option data from a remote data provider using the communication interface or causes the option data to be retrieved from the storage unit and causes the graphical representation of the filtered option data to be displayed to the user; wherein the graphical representation of the filtered option data comprises interposed volatility data for a plurality of option contracts; and wherein the filtering criteria comprises at least selecting out of the money options and excluding options with no bids;
wherein the system is configured to play a skew chart movie representing historical changes in skew charts over a selected time period, and wherein each frame in the movie represents a skew chart from a specific day during the selected time period,
wherein the graphical representation of the filtered option data comprises a three-dimensional chart of option volatility as a function of at least one of an option strike price or a time to expiration of the plurality of option contracts.

2. The computerized system of claim 1, further comprising a display unit, wherein the processing unit is further configured to cause the graphical representation of the filtered option data to be displayed on the display unit.

3. The computerized system of claim 1, wherein the processing unit is further configured to cause the graphical representation of the filtered option data to be transmitted via the communication interface to a client computer system for display to the user.

4. The computerized system of claim 1, wherein the graphical representation of the filtered option data comprises a graphical image file representing a chart.

5. The computerized system of claim 1, wherein the graphical representation of the filtered option data comprises information on a plurality of data points on a chart.

6. The computerized system of claim 1, wherein the processing unit is further configured to executed a database management system operable to store the option data in the storage unit and to retrieve the option data from the storage unit in response to a query.

7. The computerized system of claim 6, wherein the stored option data is historical option data.

8. The computerized system of claim 1, wherein the option data obtained from a remote data provider is a real time option data.

9. The computerized system of claim 1, wherein the graphical representation of the filtered option data comprises a three-dimensional chart of option volatility as a function of an option strike price and a time to expiration of the plurality of option contracts.

10. The computerized system of claim 9, wherein in the three-dimensional chart of option volatility, data points corresponding to the same strike price are connected with lines.

11. The computerized system of claim 9, wherein the three-dimensional chart of option volatility, data points corresponding to the same option contract are connected with lines.

12. The computerized system of claim 9, wherein the processing unit is configured to generate an animated graphical representation of the filtered option data indicative of historical option volatility changes over time.

13. The computerized system of claim 1, wherein the volatility data for each of the plurality of option contracts is color-coded with a unique color designation.

14. The computerized system of claim 1, wherein the graphical representation of the filtered option data comprises a shape-based presentation of the filtered option data.

15. The computerized system of claim 1, wherein the processing unit is configured to cause a user interface to be provided to the user and to receive an instruction from the user using the user interface.

16. The computerized system of claim 15, wherein the instruction received from the user comprises a selection of the plurality of option contracts.

17. The computerized system of claim 15, wherein the instruction received from the user comprises information on the filtering criteria.

18. The computerized system of claim 15, wherein the instruction received from the user comprises a selection of option strike prices.

19. The computerized system of claim 1, wherein the processing unit is configured to automatically detect put option and call option disparity and to cause the user to be alerted of the detected disparity.

20. The computerized system of claim 1, wherein the processing unit is configured execute a charting application for rendering a digital image of the graphical representation of the filtered option data.

21. A computer-implemented method performed in a computerized system, the method comprising:
enabling a communication interface of the computerized system to connect to a network;
using a processing unit to obtain option data, to filter the option data in accordance with filtering criteria, and to generate graphical representation of the filtered option data for display to a user;
allocating a storage resource in a storage unit, wherein the option data is obtained from a remote data provider via the communication interface or retrieved from the storage unit; and
causing the graphical representation of the filtered option data to be displayed to the user, wherein the graphical representation of the filtered option data comprises interposed volatility data for a plurality of option contracts and wherein the filtering criteria comprises a least selecting out of the money options and excluding options with no bids, and wherein the system is configured to play a skew chart movie representing historical changes in skew charts over a selected time period, and wherein each frame in the movie represents a skew chart from a specific day during the selected time period,
wherein the graphical representation of the filtered option data comprises a three-dimensional chart of option volatility as a function of at least one of an option strike price or a time to expiration of the plurality of option contracts.

22. A computer-readable memory embodying a set of instructions, which, when executed by a processing unit of a computerized system, cause the processing unit to execute a computer-implemented method performed in the computerized system, the method comprising:
enabling a communication interface of the computerized system to connect to a network;
using the processing unit to obtain option data, to filter the option data in accordance with filtering criteria, and to generate graphical representation of the filtered option data for display to a user;
allocating a storage resource in a storage unit, wherein the option data is obtained from a remote data provider via the communication interface or retrieved from the storage unit;
causing the graphical representation of the filtered option data to be displayed to the user, wherein the graphical representation of the filtered option data comprises interposed volatility data for a plurality of option contracts and wherein the filtering criteria comprises at least selecting out of the money option and excluding options with no bids, and wherein the system is configured to play a skew chart movie representing historical changes in skew charts over a selected time period, and wherein each frame in the movie represents a skew chart from a specific day during the selected time period; and
receiving, via an interface, (1) a selection of the selected time period and (2) input from a user to control the display of the skew chart movie,
wherein the graphical representation of the filtered option data comprises a three-dimensional chart of option volatility as a function of at least one of an option strike price or a time to expiration of the plurality of option contracts.

* * * * *